US012551863B2

(12) United States Patent
Kortunov et al.

(10) Patent No.: US 12,551,863 B2
(45) Date of Patent: Feb. 17, 2026

(54) SYSTEMS AND METHODS FOR GAS STORAGE AND TRANSPORTATION

(71) Applicant: ExxonMobil Technology and Engineering Company, Annandale, NJ (US)

(72) Inventors: Pavel V. Kortunov, Flemington, NJ (US); Joseph M. Falkowski, Hampton, NJ (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 734 days.

(21) Appl. No.: 17/760,339

(22) PCT Filed: Jan. 19, 2021

(86) PCT No.: PCT/US2021/013995
§ 371 (c)(1),
(2) Date: Aug. 8, 2022

(87) PCT Pub. No.: WO2021/173245
PCT Pub. Date: Sep. 2, 2021

(65) Prior Publication Data
US 2023/0121414 A1    Apr. 20, 2023

Related U.S. Application Data

(60) Provisional application No. 62/980,711, filed on Feb. 24, 2020.

(51) Int. Cl.
*B01J 20/22* (2006.01)
*B01D 53/02* (2006.01)
*B01J 20/28* (2006.01)
*B01J 20/34* (2006.01)

(52) U.S. Cl.
CPC ......... *B01J 20/226* (2013.01); *B01D 53/02* (2013.01); *B01J 20/28004* (2013.01); *B01J 20/28011* (2013.01); *B01J 20/3483* (2013.01); *B01D 2253/204* (2013.01); *B01D 2253/31* (2013.01); *B01D 2257/7025* (2013.01)

(58) Field of Classification Search
CPC .......... B01J 20/226; B01J 20/28004; B01J 20/28011; B01J 20/3483; B01D 53/02
See application file for complete search history.

(56) References Cited

U.S. PATENT DOCUMENTS

| | | | |
|---|---|---|---|
| 9,662,632 B1 | 5/2017 | Allendorf et al. | |
| 2013/0139686 A1* | 6/2013 | Wilmer | C07F 3/06 95/146 |
| 2020/0330918 A1 | 10/2020 | Dinca et al. | |
| 2021/0023528 A1 | 1/2021 | Chen et al. | |
| 2022/0153757 A1 | 5/2022 | Falkowski et al. | |

FOREIGN PATENT DOCUMENTS

| | | |
|---|---|---|
| CN | 101346182 A | 1/2009 |
| CN | 109414688 A | 3/2019 |
| CN | 109569026 A | 4/2019 |
| CN | 109824910 A | 5/2019 |
| CN | 109851559 A | 6/2019 |
| CN | 110016145 A | 7/2019 |
| KR | 10-2018-0008331 A | 1/2018 |
| WO | 2007/111739 A2 | 10/2007 |

OTHER PUBLICATIONS

Lee et al., Angew Chem. Int. Ed., (2018), v.57, p. 7869-7873. (provided previously).*
Vigato, P.A., et al., "Acyclic and cyclic compartmental ligands: Recent results and perspectives", Coordination Chemistry Reviews, vol. 256, pp. 953-1114 (2012).
Haggin, J., "Penn's Weisz Wins 1985 Perkin Medal for Applied Chemistry Work", Chemical and Engineering News, p. No. 27 (Apr. 1, 1985).
Jomeh, G.A., "Synthesis And Spectroscopic Properties of Group 11 Coordination Polymers with Mixed Pyrazolate/ Diimine Ligands", Department of Chemistry and Biochemistry College of Arts and Sciences, pp. 1-103, (Aug. 2015).
International Preliminary Report on Patentability PCT/US2021/013995 issued Aug. 30, 2022 (7 pages).
Notice of Allowance received for Chinese Patent Application No. 202180016228.8, mailed on Jul. 18, 2024, 6 pages (2 page of English Translation and 4 pages of Original Document).
Office action received for Chinese Patent Application No. 202180016228.8, mailed on May 1, 2024, 9 pages (4 pages of Original OA and 5 pages of English Translation).
(Continued)

*Primary Examiner* — Yong L Chu
(74) *Attorney, Agent, or Firm* — Shook, Hardy & Bacon L.L.P.

(57) ABSTRACT

Methods of contacting a fluid comprising a light hydrocarbon with a metal-organic framework adsorbent having bis (pyrazolyl) ethanediimine ligands and internal pores; adsorbing the fluid in at least a portion of the internal pores of the metal-organic framework thereby creating an adsorbed fluid; storing the adsorbed fluid in the internal pores of the metal-organic framework; and releasing the adsorbed fluid from the internal pores of the metal-organic framework, wherein the metal-organic framework adsorbent undertakes a reversible phase transition upon adsorbing the fluid. Systems of a metal-organic framework having bis (pyrazolyl) ethanediimine ligands and internal pores, wherein the metal-organic framework undertakes a reversible phase transition upon adsorption and desorption of a light hydrocarbon fluid; wherein the fluid is stored in the internal pores of the metal-organic framework.

18 Claims, 4 Drawing Sheets

(56) References Cited

OTHER PUBLICATIONS

International Search Report and Written Opinion received for PCT Patent Application No. PCT/US2021/013995, mailed on Apr. 16, 2021, 12 pages.

Office action received for Chinese Patent Application No. 202180016228.8, mailed on Nov. 23, 2023, 18 pages (8 pages of Original OA and 10 pages of English Translation).

* cited by examiner

SYSTEMS AND METHODS FOR GAS STORAGE AND TRANSPORTATION

This application is a National Phase Application claiming priority to PCT Application Serial No. PCT/US2021/013995 filed Jan. 19, 2021, which claims priority to and the benefit of U.S. Provisional Application No. 62/980,711, filed Feb. 24, 2020, the disclosures of which are incorporated herein by reference in their entireties.

FIELD OF INVENTION

The present application relates to systems and methods using flexible metal-organic framework (MOF) adsorbents for storing and transporting light hydrocarbon fluids.

BACKGROUND

Hydrocarbon gases such as methane, ethane, and ethylene are generally produced in locations that are geographically mismatched with the locations of their utilization as a fuel or a feedstock in the chemical industry. As a result, such gas are often transported from production to utilization facilities, preferably by pipeline. With the growing volume of natural gas and the limited local demand, North America may become the largest exporter of natural gas methane to Europe and of natural gas liquids, such as ethane, propane, and butane, to the growing Asia-Pacific market, which is in high demand for plastics and synthetic fluid made of ethylene and propylene. With the prohibitive cost of pipeline transportation, especially overseas, light gases are mainly transported in compressed or liquefied forms. The transport of compressed light hydrocarbon gases such as methane, ethane, or ethylene present several challenges. The high pressures required to achieve practical energy/gas density requires robust and costly transportation vessels and introduces safety complications associated with high-pressure vessels. Cryogenic transport of these gases also present challenges because of the requirement of capital intensive cooling/compression systems as well as thermally insulated transport containers.

Additionally, when dispersing compressed gas, depressurization of the system is required for recovery of all of the stored gas. Thus, any application requiring appreciable pressure, such as feeding into a natural gas pipeline, will necessitate either recompression or an intentional excess gas in the storage tank to provide the requisite pressure. This may lead to drastically lower transport capacities. An alternative to compressed or liquefied transportation is the use of microporous adsorbents that can yield similar gas densities as compressed gas, albeit at much lower pressures. Standard adsorbents, however, will suffer from similar issues including the need for recompression to afford gas at appreciable pressures. As such, there is a need for adsorbent materials that can provide high capacity hydrocarbon gas storage at reduced pressures and without the need for pressure loss.

SUMMARY OF INVENTION

The present application relates to systems and methods using flexible metal organic framework ("MOF") adsorbents based on multidentate organic ligands comprising a diimine scaffold for storing and transporting light hydrocarbon fluids.

Methods described herein may comprise contacting a fluid comprising a light hydrocarbon with a metal-organic framework adsorbent having a plurality of internal pores; adsorbing the fluid at a first pressure and at a first temperature in at least a portion of the internal pores of the metal-organic framework adsorbent thereby creating an adsorbed fluid; storing the adsorbed fluid in the internal pores of the metal-organic framework adsorbent at a second pressure and at a second temperature; and releasing the adsorbed fluid from the internal pores of the metal-organic framework adsorbent, wherein the metal-organic framework adsorbent comprises a bis(pyrazolyl)ethanediimine ligand, and wherein the metal-organic framework adsorbent undertakes a reversible phase transition upon adsorbing the fluid.

Systems described herein may comprise a metal-organic framework adsorbent having a plurality of internal pores, wherein the metal-organic framework adsorbent comprises a bis(pyrazolyl)ethanediimine ligand; wherein the metal-organic framework adsorbent undertakes a reversible phase transition upon adsorption and desorption of a fluid comprising a light hydrocarbon, the adsorption being carried out at a first pressure and at a first temperature; wherein the fluid is stored in the internal pores of the metal-organic framework adsorbent at a second pressure and at a second temperature.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present application relates to systems and methods using flexible metal organic framework ("MOF") adsorbents based on multidentate organic ligands comprising a diimine scaffold for storing and transporting light hydrocarbon fluids. More particularly, the MOF adsorbents of the present application may be based on metal centers, such as divalent metal centers, and multidentate organic bis(pyrazolyl)ethanediimine ligands.

The use of flexible MOFs as adsorbent materials for the transport and storage of hydrocarbon fluids, such as light hydrocarbon fluids, may proceed with a phase transition from a small-pore phase to a large-pore phase upon adsorption of the hydrocarbon fluids. This phase transition occurs according to a type IV isotherm characterized by a low adsorption up to the phase transition pressure, at which the adsorption capacity of the adsorbent materials is multiplied, such as multiplied by about two to about six times the capacity of the adsorbent materials before the phase transition. This phase transition is reversible and allows for the rapid and almost complete release of the adsorbed hydrocarbon fluids, including the release of from about 80% to about 99% of the adsorbed hydrocarbon fluids, at a relatively constant pressure, thus resulting in high hydrocarbon fluid recovery.

Before describing the various embodiments of the present disclosure in further detail, a listing of terms follows to aid in better understanding the present disclosure.

All numerical values within the detailed description and the claims herein are modified by "about" or "approximately" with respect to the indicated value, and take into account experimental error and variations that would be expected by a person having ordinary skill in the art.

Unless otherwise indicated, room temperature is about 23° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A," and "B."

For the purposes of the present disclosure, the new numbering scheme for Groups of the Periodic Table is used as described in CHEMICAL AND ENGINEERING NEWS, 63 (5), pg. 27 (1985). In said numbering scheme, the groups (columns) are numbered sequentially from left to right from 1 through 18, excluding the f-block elements (lanthanides and actinides).

The term "hydrocarbon" refers to a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different numbers of carbon atoms. The term "$C_n$" refers to hydrocarbon(s) or a hydrocarbyl group having n carbon atom(s) per molecule or group, wherein n is a positive integer. Such hydrocarbon compounds may be one or more of linear, branched, cyclic, acyclic, saturated, unsaturated, aliphatic, or aromatic. The term "light hydrocarbons" refers to hydrocarbons having 1 to 6 carbon atoms, such as methane, ethane, propane, butane, pentane and hexane.

The term "framework" as used herein, refers to a highly ordered structure comprised of secondary building units (SBUs) that can be linked together in defined, repeated and controllable manner, such that the resulting structure is characterized as being porous, periodic and crystalline. Typically, "frameworks" are two dimensional (2D) or three dimensional (3D) structures. Examples of "frameworks" include, but are not limited to, "metal-organic frameworks" or "MOFs", "zeolitic imidazolate frameworks" or "ZIFs", or "covalent organic frameworks" or "COFs". While MOFs and ZIFs comprise SBUs of metals or metal ions linked together by forming covalent bonds with linking clusters on organic linking moieties, COFs are comprised of SBUs of organic linking moieties that are linked together by forming covalent bonds via linking clusters. As used herein, "framework" does not refer to coordination complexes or metal complexes. Coordination complexes or metal complexes are comprised of a relatively few number of centrally coordinated metal ions (i.e., less than 4 central ions) that are coordinately bonded to molecules or ions, also known as ligands or complexing agents. By contrast, "frameworks" are highly ordered and extended structures that are not based upon a centrally coordinated ion, but involve many repeated secondary building units (SBUs) linked together (e.g., >10, >100, >1000, >10,000, etc.). Accordingly, "frameworks" are orders of magnitude much larger than coordination complexes and have different structural and chemical properties due to the frameworks open and ordered structure.

As used herein, the term "multidentate" refers to a compound having two or more potential sites for coordinating a metal center. Accordingly, the term "multidentate" encompasses bidentate, tridentate, tetradentate, and higher denticity ligands.

The term "metal center" refers to a single metal atom or metal ion, or a group (cluster) of metal atoms or metal ions to which a ligand is coordinatively bonded.

The term "diimine" refers to a chemical entity bearing a two carbon atoms that are singly bonded together, and each carbon atom is doubly bonded to a nitrogen atom. The two carbon atoms may be independently substituted with H and/or a hydrocarbyl group, wherein the substitution upon each carbon atom may be the same or different.

The term "at least partially crystalline" means that a substance exhibits an X-ray powder diffraction pattern.

The term "binding site" refers to a chemical entity capable of coordinating a metal center by a metal-ligand bond.

The term "adsorption" refers to a process in which atoms or molecules move from a bulk phase (that is, solid, liquid, or gas) onto a solid or liquid surface of a porous material. The term adsorption may be used in the context of solid surfaces in contact with liquids, gases or fluids. Molecules that have been adsorbed onto solid surfaces are referred to generically as adsorbates, and the surface to which they are adsorbed as the substrate or adsorbent. Adsorption is usually described through isotherms, that is, functions which connect the amount of adsorbate on the adsorbent, with its pressure (if gas) or concentration (if liquid). In general, "desorption" refers to the reverse of adsorption, and is a process in which molecules adsorbed on a surface are transferred back into a bulk phase.

A "gas" or "fluid" refers to a natural gas, artificial gases, synthetic gases, substantially purified gases or purified gases or fluids. Exemplary fluids or gases include methane, ethane, and ethylene.

The present disclosure provides systems and methods using flexible MOFs for storing and transporting light hydrocarbon fluids. In these systems and methods the MOFs comprise a plurality of metal centers and a plurality of multidentate ligands.

The flexible MOF adsorbents used in the systems and methods of the present disclosure may feature a multidentate organic ligand comprising diimine moieties, such that the diimine ligands of Formula 1.

Formula 1

Referring to Formula 1, each $R^1$ is independently H or an optionally substituted hydrocarbyl group, wherein each occurrence of $R^1$ may be the same or different and independently be $C_1$-$C_{30}$ alkyl groups, $C_2$-$C_{30}$ alkenyl or alkynyl groups, $C_3$-$C_{30}$ cycloalkyl groups, $C_4$-$C_{10}$ aromatic or heteroaromatic groups, any of which may be optionally substituted, and L is independently a functionality capable of coordinating a metal center (i.e., a ligand), which may be monodentate, bidentate, tridentate, or higher denticity, wherein each occurrence of L may be the same or different and independently be an aromatic, heterocyclic or heteroaro- matic ring bearing one or more of a basic nitrogen atom (either exocyclic or endocyclic). The functionality upon each L may complex a metal center in any manner including monodentate complexation, bidentate complexation, tridentate complexation, or higher denticity complexation. In still more specific examples, each L may be a pyrazole.

Accordingly, still more specific examples of multidentate organic ligands suitable for use in the flexible MOF adsorbents used in the systems and methods of the present disclosure may have the structure of Formula 2,

Formula 2 wherein each $R^1$ is independently selected as above and may be the same or different. Attachment of the imine nitrogen atoms at another ring position of the pyrazole groups is also possible, as shown in Formula 3.

Formula 3

In a still more specific example, the multidentate suitable for use in the flexible MOF adsorbents used in the systems and methods of the present disclosure may comprise a diimine moiety bridging together two or more pyrazolyl moieties. In particular, these multidentate ligands may comprise bispyrazolylethanediimine ligands. More particularly, N,N'-di(1H-pyrazol-4-yl)ethane-1,2-diimine (Formula 4) and similar multidentate organic ligands bearing a linking diimine moiety may form MOFs having flexible network structures suitable for adsorbing light hydrocarbon fluids or gases according to the systems and methods of this disclosure.

Formula 4

The metal centers that may be present in the flexible MOF adsorbents used in the systems and methods of the present disclosure may comprise divalent metals. Monovalent, trivalent, and tetravalent metals may also be suitably included, either alone or in combination with one or more divalent metals. Suitable divalent metals that may be present in the MOFs of the systems and methods disclosed herein may include, for example, zinc, cobalt, nickel, copper, iron, magnesium, manganese, calcium, strontium, barium, chromium, palladium, platinum, cadmium, mercury, germanium, or any combination thereof. The metal(s) located in the plurality of metal centers may be introduced when reacting a suitable metal source with the multidentate organic ligands disclosed above, or at least a portion of the metal(s) in the metal centers may be introduced via an exchange reaction after forming the at least partially crystalline network structure defining the metal-organic framework material. The metal centers may be present in any form including, but not limited to, discrete metal cations, metal clusters, metal chains, or any combination thereof.

In some embodiments, suitable metal salts that may be used to form MOFs used in the systems and methods according to the disclosure herein include metal ions such as, but not limited to, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$ and $Bi^+$. Particularly preferred metal ions are $Zn^{2+}$ and $Co^{2+}$. Other oxidation states of these metal ions may also be suitably used in some instances. Depending on the identity of the multidentate organic ligand and the conditions under which the flexible MOFs may be prepared, suitable counterion forms for the metal ions may include, but are not limited to, nitrate, nitrite, sulfate, hydrogen sulfate, oxide, acetate, formate, oxide, hydroxide, benzoate, alkoxide, carbonate, acetylacetonate, hydrogen carbonate, fluoride, chloride, bromide, iodide, phosphate, hydrogen phosphate, dihydrogen phosphate, or the like. When forming a MOF material using a metal salt, it may be desirable to combine a carboxylic acid with zinc oxide when synthesizing the flexible MOFs using the multidentate organic ligands disclosed herein.

In some instances, a preformed metal cluster, such as $Zn_4O(2,2\text{-dimethylbutanoate})_6$ ($Zn_4O(DMBA)_6$) or similar metal carboxylate clusters, may be particularly suitable for preparing the flexible MOFs used in the methods and systems of the present disclosure. Other suitable examples of preformed metal clusters that may be suitable for preparing these flexible MOFs include other branched or unbranched acid metal clusters, including $Zn_4O(acetate)_6$, $Zn_4O(benzoate)_6$ or zinc amidate clusters. While preformed metal clusters may be particularly desirable metal sources for promoting formation of these flexible MOFs, other metal sources may also satisfactorily form structurally related MOFs. Additional metal sources to form the flexible MOFs of the present disclosure may include metal sources that are not preformed metal clusters. For example, such metal sources may include zinc oxide or zinc carbonate.

The flexible MOF adsorbents used in the systems and methods of the present disclosure may comprise a plurality of metal centers, and a multidentate organic ligand coordinated to the plurality of metal centers via at least one binding site to define an at least partially crystalline network structure having a plurality of internal pores. The flexible MOF adsorbents used in the systems and methods of the present disclosure may be based on diimine multidentate organic ligands, such as bis(pyrazolyl)ethanediimine multidentate organic ligands, such as N,N'-di(1H-pyrazol-4-yl)ethane-1,2-diimine ligands, and may be characterized in terms of their internal porosity. Particularly, the flexible MOF adsorbents used in the systems and methods of the present disclosure, which may be based on N,N'-di(1H-pyrazol-4-yl)ethane-1,2-diimine as multidentate organic ligand, may include micropores, mesopores, macropores and any combination thereof. Micropores are defined herein as having a pore size of about 2 nm or below, and mesopores are defined herein as having a pore size from about 2 nm to about 50 nm. Furthermore, the flexible MOF adsorbents used in the systems and methods of the present disclosure, which may be based on N,N'-di(1H-pyrazol-4-yl)ethane-1,2-diimine as multidentate organic ligand, may include surface areas up to about 2000 m²/g, including up to 1300 m²/g for example. The flexible MOF adsorbents used in the systems and methods of the present disclosure, which may be based on N,N'-di(1H-pyrazol-4-yl)ethane-1,2-diimine as multidentate organic ligand, may have pore volumes ranging from about 0.09 cc/g to about 0.90 cc/g, or from about 0.10 cc/g to about 0.85 cc/g, or from about 0.11 cc/g to about 0.80 cc/g.

Further details regarding the flexible MOF comprising a bis(pyrazolyl)ethanediimine as multidentate organic ligand, such as N,N'-di(1H-pyrazol-4-yl)ethane-1,2-diimine, suitable for as flexible MOF adsorbents used in the systems and methods of the present disclosure may be found in U.S. Application No. 62/827,443, the content of which is incorporated into the present application by reference.

The systems and methods of the present disclosure may provide adsorptive gas or fluid storage and transportation using a flexible MOF comprising a bis(pyrazolyl)ethanediimine as multidentate organic ligand, such as N,N'-di(1H-pyrazol-4-yl)ethane-1,2-diimine, according to a three-step process. The first step may include an initial gas or fluid adsorption step opening the structure of the flexible MOF and maximizing the adsorbed gas or fluid density. The second step may include a pressure reduction to attain a safe transportation pressure while maintaining a high-adsorbed gas or fluid density. The third step may include the desorption of about 80% to about 90% of the adsorbed gas or fluid at moderate discharge pressures of from about 2 bar to about 25 bar at temperatures of about 10° C. to about 40° C., of about 15° C. to about 35° C., of about 20° C. to about 35° C., or of about 25° C. to about 30° C.

More specifically a method of the present disclosure may include contacting a flexible MOF adsorbent comprising a bis(pyrazolyl)ethanediimine multidentate organic ligand, such as N,N'-di(1H-pyrazol-4-yl)ethane-1,2-diimine, having a plurality of internal pores with a fluid; adsorbing the fluid at a first pressure in at least a portion of the internal pores of the flexible MOF adsorbent thereby creating an adsorbed fluid; maintaining the adsorbed fluid in the internal pores of the flexible MOF adsorbent at a second pressure; and releasing the adsorbed fluid from the internal pores of the flexible MOF adsorbent at a third pressure, wherein at least 80% of the adsorbed fluid is released at a third pressure in a range of about 2 bar to about 25 bar at temperatures of about 10° C. to about 40° C., of about 15° C. to about 35° C., of about 20° C. to about 35° C., or of about 25° C. to about 30° C.

More specifically, the methods and systems of the present disclosure may be carried out at a temperature of about 10° C. to about 40° C., of about 15° C. to about 35° C., of about 20° C. to about 35° C., or of about 25° C. to about 30° C. Further, in the method of the present disclosure, the first pressure decreases when the temperature decreases. Further, in the method of the present disclosure, the second pressure increases when the temperature increases. Also, in the method of the present disclosure, the phase transition may be endothermic.

Further, the methods and systems of the present disclosure may be such that when the fluid comprises methane, ethane, or ethylene, the desorption of at least 90% of the fluid is at a third pressure in a range of about 5 bar to about 10 bar at temperatures of about 10° C. to about 40° C., of about 15° C. to about 35° C., of about 20° C. to about 35° C., or of about 25° C. to about 30° C.

Further, in the methods and systems of the present disclosure, when the light hydrocarbon includes methane, the first pressure may be at least 40 bar, of at least 45 bar, of at least 50 bar, of at least 55 bar, of at least 60 bar, of at least 65 bar, or of at least 70 bar, at temperatures of about 10° C. to about 40° C. of about 10° C. to about 40° C., of about 15° C. to about 35° C., of about 20° C. to about 35° C., or of about 25° C. to about 30° C.

Further, in the methods and systems of the present disclosure, when the light hydrocarbon includes $C_2$ hydrocarbons, the first pressure may be at least 2 bar, at least 5 bar, at least 10 bar, at least 15 bar, or at least 20 bar, at temperatures of about 10° C. to about 40° C., of about 15° C. to about 35° C., of about 20° C. to about 35° C., or of about 25° C. to about 30° C.

Further, in the methods and systems of the present disclosure, the second pressure may be in a range of about 40 bar to about 130 bar, of about 50 bar to about 120 bar, of about 60 bar to about 115 bar, or of about 70 bar to about 110 bar, at temperatures of about 10° C. to about 40° C., of about 15° C. to about 35° C., of about 20° C. to about 35° C., or of about 25° C. to about 30° C.

More specifically, the flexible MOF used in the method of the present disclosure may comprise a plurality of divalent metal centers. In particular, the flexible MOF used in the method of the present disclosure may comprise zinc, cobalt, nickel, copper, iron, magnesium, manganese, calcium, strontium, barium, chromium, palladium, platinum, cadmium, mercury, germanium, or any combination thereof. More particularly, the flexible MOF used in the method of the present disclosure may comprise zinc.

Further, in the method of the present disclosure, the fluid of gas may include a light hydrocarbon. More particularly, the fluid may include a $C_1$-$C_5$ hydrocarbon. More particularly, the fluid may include a $C_1$-$C_2$ hydrocarbon. More particularly, the fluid may include methane, ethane, or ethylene.

Further, the flexible MOF used in the methods of the present disclosure may include internal pores having a pore volume in a range of about 0.09 cc/g to about 0.90 cc/g, or from about 0.10 cc/g to about 0.85 cc/g, or from about 0.11 cc/g to about 0.80 cc/g. 0.1 cc/g to about 1 cc/g. Further, the flexible MOF used in the methods of the present disclosure may have a crystal density of from about 1.5 cc/g to about 0.5 cc/g, or from about 1.45 cc/g to about 0.75 cc/g, or from about 1.44 cc/g to about 0.72 cc/g. The flexible MOF used in the method of the present disclosure may undertake a reversible phase transition upon adsorption of the fluid. Further, the volume of the internal pores of the flexible MOF used in the method of the present disclosure may increase by about 0.5 cc/g to about 0.9 cc/g, or from about 0.55 cc/g to about 0.85 cc/g, or from about 0.60 cc/g to about 0.80 cc/g, upon adsorption of the fluid. For example, the flexible MOF based on bis(pyrazolyl)ethanediimine multidentate organic ligands, such as N,N'-di(1H-pyrazol-4-yl)ethane-1,2-diimine, suitable for the methods of the present disclosure may undergo a phase transition during the hydrocarbon gas adsorption expanding the pore volume from about 0.09 cc/g to about 0.90 cc/g, or from about 0.10 cc/g to about 0.85 cc/g, or from about 0.11 cc/g to about 0.80 cc/g, at the expense of the crystal density of the flexible MOF (without fluid), which may be reduced from about 1.5 cc/g to about 0.5 cc/g, or from about 1.45 to about 0.75 cc/g, or from about 1.44 cc/g to about 0.72 cc/g. The flexible MOF based on bis(pyrazolyl)ethanediimine multidentate organic ligands, such N,N'-di(1H-pyrazol-4-yl)ethane-1,2-diimine, suitable for the methods of the present disclosure may undergo a phase transition during the hydrocarbon gas desorption reducing the pore volume from about 0.90 cc/g to about 0.09 cc/g, or from about 0.85 cc/g to about 0.10 cc/g, or from about 0.80 cc/g to about 0.11 cc/g.

The highest adsorption capacity and adsorbed fluid or gas density may be achieved according to the methods of the present disclosure in the large pore phase of the flexible MOF at elevated pressures, such as at pressures of at least about 20 bar, or at least about 30 bar, or at least about 50 bar, or at least about 80 bar, or at least about 100 bar, or at least about 120 bar. In particular, for fluids comprising $C_2$ hydrocarbons such as ethane and ethylene, these pressures are at least about 20 bar, or at least about 25 bar, or at least about 30 bar. In particular, for fluids comprising $C_1$ hydrocarbons such as methane, these pressures are at least about 80 bar, or at least about 100 bar, or at least about 120 bar. However, some fluid or gas may remain in the large pore phase upon depressurization to a moderate pressure of about 10 bar to about 65 bar with the flexible MOF having an adsorption capacity from about 150 kg/m$^3$ to about 250 kg/m$^3$, or from about 175 kg/m$^3$ to about 225 kg/m$^3$, or from about 180 kg/m$^3$ to about 200 kg/m$^3$. More particularly, for fluids comprising $C_2$ hydrocarbons such as ethane and ethylene, some fluid or gas may remain in the large pore phase upon depressurization to a moderate pressure of about 10 bar. More particularly, for fluids comprising $C_1$ hydrocarbons such as methane, some fluid or gas may remain in the large pore phase upon depressurization to a moderate pressure of about 65 bar. A unique advantage of the flexible MOF of the methods of the present disclosure is the phase transition to a narrow pore phase at moderate pressure of from about 2 bar to about 25 bar, which facilitates desorption of the remaining adsorbed fluid or gas from the flexible MOF.

Additionally, a system of the present disclosure may include a flexible MOF adsorbent having a plurality of internal pores, the MOF comprising a multidentate organic ligand comprising a bis(pyrazolyl)ethanediimine ligand such as N,N'-di(1H-pyrazol-4-yl)ethane-1,2-diimine; wherein the MOF undertakes a reversible phase transition upon adsorption and desorption of a fluid comprising methane, ethane, or ethylene, the adsorption being carried out at a first pressure and the desorption being carried out at a third pressure; wherein the fluid is stored in the internal pores of the metal-organic framework adsorbent at a second pressure; and wherein the desorption of at least 80% of the fluid is at a third pressure in a range of about 2 bar to about 25 bar.

The adsorption and desorption into and from the MOF comprising a multidentate organic ligand comprising a bis(pyrazolyl)ethanediimine ligand described above may be dependent on the temperature of the system. For example, at lower temperatures, adsorption may occur at lower pressures while, adsorption may occur at higher pressures when temperature increases. This behavior can be leveraged to yield desorption/adsorption pressures at desired values. For example light hydrocarbons may be adsorbed into the flexible MOF comprising a multidentate organic ligand comprising a bis(pyrazolyl)ethanediimine ligand adsorbent and, upon an increase in temperature, these light hydrocarbons may be desorbed at higher pressures. Conversely, light hydrocarbons may be adsorbed at lower temperatures allowing for adsorption at lower pressures, and upon a temperature rise retain the adsorbed light hydrocarbon due to the large desorption hysteresis of the MOF comprising a multidentate organic ligand comprising a bis(pyrazolyl)ethanediimine ligand described above. This allows for adsorption and desorption of the light hydrocarbons at modest pressures without loss of the compressive energy.

The light hydrocarbon may be stored and transported using the MOF comprising a multidentate organic ligand comprising a bis(pyrazolyl)ethanediimine ligand described above from a first location such as a production facility to a second location such as a utilization facility. Such storage and transportation may be less costly than the current pipeline transportation, especially overseas, in compressed or liquefied forms. The storage and transportation of compressed light hydrocarbon gases such as methane, ethane, or ethylene using the MOF comprising a multidentate organic ligand comprising a bis(pyrazolyl)ethanediimine ligand described above may allow for lower pressures than the pipeline pressures requiring high-pressure vessels thereby resulting in lower overall costs for light hydrocarbon storage and transportation.

In another aspect of the present disclosure, the endothermic nature of the phase transition, in particular in light of the temperature-dependence of the step pressure. More specifically, upon adsorption, the heat of adsorption poses a challenge for heat management as this temperature rise may be concomitant with the loss of capacity and the shifting of the adsorption step to higher pressures. Due to the endothermic nature of the phase transition, however, much of this heat may be utilized by the material to perform the phase transformation. Accordingly, the endothermic nature of the phase transition may mitigate much of the heat management requirements when envisioning a cold-load type application.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Examples Embodiments

Embodiments disclosed herein include Embodiment A and Embodiment B.

Embodiment A: A method comprising contacting a fluid comprising a light hydrocarbon with a metal-organic framework adsorbent having a plurality of internal pores; adsorbing the fluid at a first pressure in at least a portion of the internal pores of the metal-organic framework adsorbent thereby creating an adsorbed fluid; storing the adsorbed fluid in the internal pores of the metal-organic framework adsorbent at a second pressure; and releasing the adsorbed fluid from the internal pores of the metal-organic framework adsorbent at a third pressure, wherein the metal-organic framework comprises a bis(pyrazolyl)ethanediimine ligand and wherein the metal-organic framework adsorbent undertakes a reversible phase transition upon adsorbing the fluid.

Embodiment A may have one or more of the following additional elements in any combination:

Element 1: further comprising the step of transporting the adsorbed fluid

Element 2: wherein the bis(pyrazolyl)ethanediimine ligand is N,N'-di(1H-pyrazol-4-yl)ethane-1,2-diimine.

Element 3: wherein the metal-organic framework comprises a plurality of divalent metal centers.

Element 4: wherein the divalent metal centers comprise zinc.

Element 5: wherein the internal pores have a pore volume in a range of about 0.1 cc/g to about 1 cc/g.

Element 6: wherein the pore volume increases by about 0.5 cc/g to about 0.9 cc/g upon adsorbing the fluid.

Element 7: wherein the crystal density of the metal-organic framework adsorbent is reversibly reduced from about 1.5 cc/g to about 0.5 cc/g upon adsorbing the fluid.

Element 8: wherein the phase transition is endothermic.

Element 9: wherein the first pressure decreases when the first temperature decreases.

Element 10: wherein the second pressure increases when the second temperature increases.

Element 11: wherein the fluid comprises methane.

Element 12: wherein the first pressure is at least about 40 bar.

Element 13: wherein the fluid comprises ethane or ethylene.

Element 14: wherein the first pressure is at least about 2 bar.

By way of non-limiting example, exemplary combinations applicable to Embodiment A include: combinations of Elements 1 and 2; combinations of Elements 1, 2, and 3; combinations of Elements 1, 3, and 4; combinations of Elements 2 and 3; combinations of Elements 2 and 3; combinations of Element 1 with one or more of Elements 2-6; combination of Element 1 with one or more of Elements 2-6 in combination with Element 7; combinations of Element 8 and Element 9; combination of Element 10 with Element 11; combination of Element 12; combination of Element 13 with Element 14.

Embodiment B: A system comprising a metal-organic framework adsorbent having a plurality of internal pores, wherein the metal-organic framework comprises a bis(pyrazolyl)ethanediimine ligand; wherein the metal-organic framework undertakes a reversible phase transition upon adsorption and desorption of a fluid comprising a light hydrocarbon, the adsorption being carried out at a first pressure and the desorption being carried out at a third pressure; wherein the fluid is stored in the internal pores of the metal-organic framework adsorbent at a second pressure.

Embodiment B may have one or more of the following additional elements in any combination: Elements 1, 7, 8, 9.

Element 15: wherein the fluid is transported at the second pressure from a first location to a second location.

By way of non-limiting example, exemplary combinations applicable to Embodiment B include: combinations of Elements 2 and 9; combinations of Elements 2 and 10; combinations of Elements 2, 9, and 10; combinations of Elements 2, 9, 10, and 15; combinations of Elements 2 and 15; combinations of Elements 2, 9, and 15; combinations of Elements 2, 10, and 15.

To facilitate a better understanding of the embodiments of the present invention, the following examples of preferred or representative embodiments are given. In no way should the following examples be read to limit, or to define, the scope of the invention.

EXAMPLES

Example 1

Figure 1:
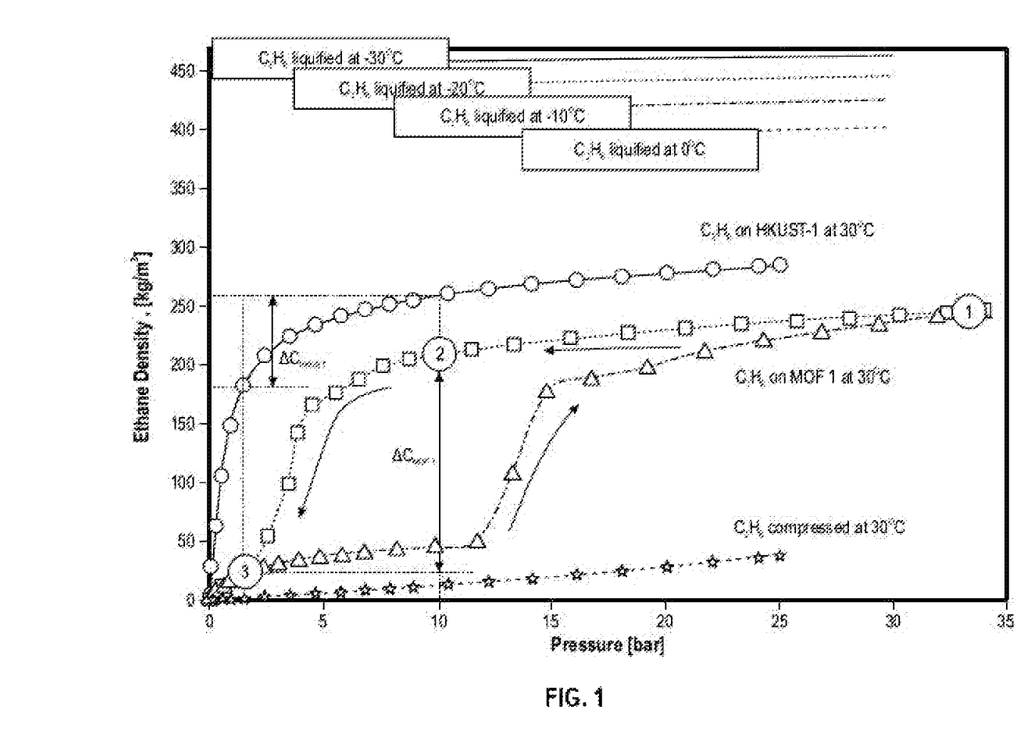
FIG. 1 presents a comparison between graphs illustrating ethane density in function of the pressure for various storage and transportation means as described in Example 1.

FIG. 1 shows the adsorption/desorption isotherm at 30° C. for ethane in a flexible MOF, EMM-60, based on zinc centers and N,N'-di(1H-pyrazol-4-yl)ethane-1,2-diimine ligands in comparison with the adsorption/desorption isotherm at 30° C. for ethane in HUKST-1 ($Cu_3(BTC)_2$ where BTC is 1,3,5-benzenetricarboxylic acid) and with the corresponding adsorption capacity for compressed ethane at 30° C., and liquefied ethane at 0° C., −10° C., −20° C., and −30° C. In particular, this graph shows the density of ethane ($kg/m^3$) as a function of pressure (bar). The adsorption of ethane in the flexible MOF based on zinc centers and N,N'-di(1H-pyrazol-4-yl)ethane-1,2-diimine ligands of the present disclosure is noted by closed squares and the desorption is noted by open squares in FIG. 1. The isotherm for HUKST-1 at 30° C. is noted by closed circles.

FIG. 1 shows that ethane adsorption on a flexible MOF, EMM-60, based on zinc centers and N,N'-di(1H-pyrazol-4-yl)ethane-1,2-diimine ligands results in higher storage capacity relative to the compressed gas. Gas density and storage capacity of liquefied gas in a range of about 350 kg/m3 to about 450 kg/m3 is higher relative to the density of the gas adsorbed on the flexible MOF. However, such gas liquefaction is an energy intensive process and is also disadvantaged by the requirement to maintain the sub-ambient temperature during the storage and transportation period. Such a requirement also limit the duration of the transportation. Safety is another concern of the liquefied gas transportation as malfunctioning cooling equipment creates a risk of the liquid phase transition into the gas phase with significant volume expansion and vessel over-pressure, burst and fire of flammable gases.

Due to the high micropore surface area of EMM-60, flexible MOF based on zinc centers and N,N'-di(1H-pyrazol-4-yl)ethane-1,2-diimine ligands of the present disclosure, adsorptive gas storage of ethane takes place at a gas density of about 170 $kg/m^3$ to about 250 $kg/m^3$ at ambient temperature and under moderate pressure of about 10 bar. Adsorptive storage at ambient temperature requires gas compressors and moderate pressure vessel to be stored and safely transported overseas during expended time. However, adsorbents with high gas capacity (such as HKUST-1) may present challenges for the gas discharge (desorption) at low pressure. FIG. 1 shows the adsorption isotherms of ethane on commercial HKUST-1 illustrating its high adsorption capacity of about 260 $kg/m^3$ at charging pressure (10 bar), but also the significant fraction of adsorbed gas (from about 180 $kg/m^3$ to about 250 $kg/m^3$) remaining within the porous MOF at discharging pressure of 2-10 bar.

The flexible MOF, EMM-60, based on zinc centers and N,N'-di(1H-pyrazol-4-yl)ethane-1,2-diimine ligands of the present disclosure undergoes a phase transition during the hydrocarbon gas adsorption that expands the pore volume from about 0.11 cc/g to about 0.8 cc/g at the expense of the crystal density, which is reduced from about 1.44 cc/g to about 0.72 cc/g. The highest adsorption capacity and adsorbed gas density is achieved in the large pore phase at elevated pressure. However, some ethane gas remains in the large pore phase upon depressurization to a moderate pressure of about 10 bar with adsorption capacity of 200 kg/m$^3$. A unique advantage of the flexible MOF of the present disclosure is the phase transition to the narrow pore phase at pressure of 2 bar of ethane that facilitates desorption of the remaining gas from the MOF.

Example 2

Figure 2:
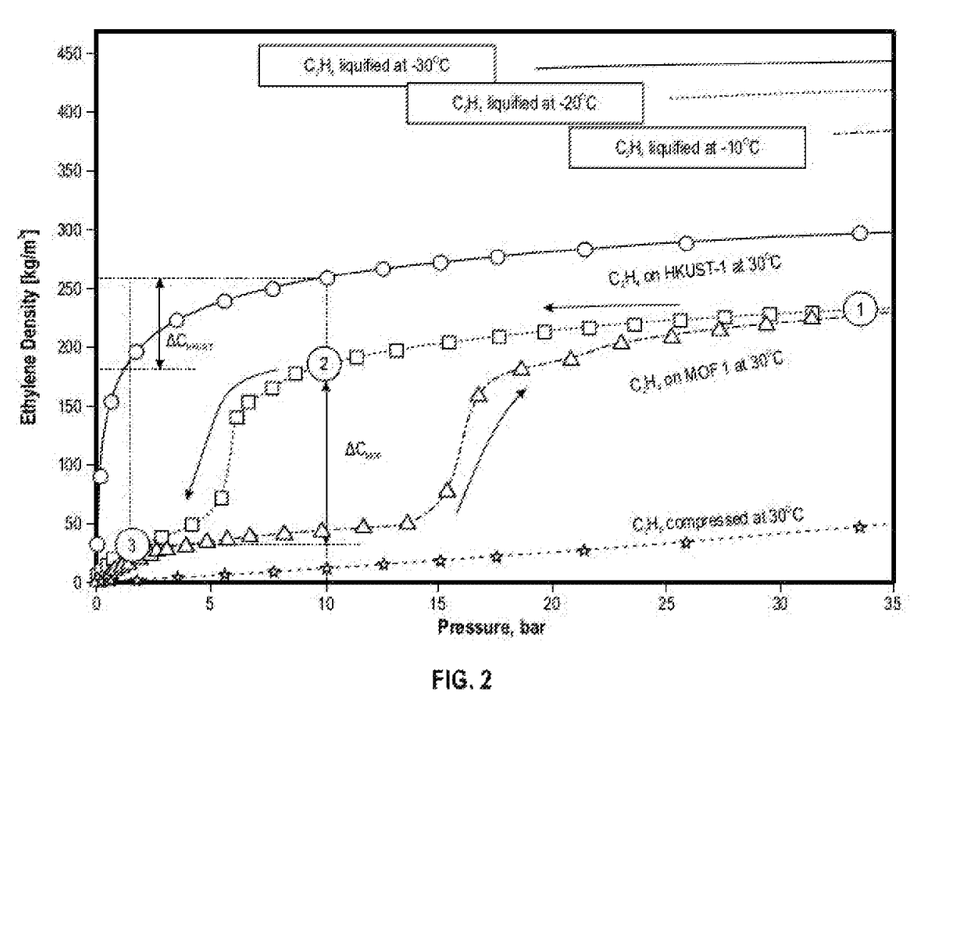
FIG. 2 presents a comparison between graphs illustrating ethylene density in function of the pressure for various storage and transportation means as described in Example 2.

FIG. 2 shows the adsorption/desorption isotherm at 30° C. for ethylene in a flexible MOF, EMM-60, based on zinc centers N,N'-di(1H-pyrazol-4-yl)ethane-1,2-diimine ligands in comparison with the adsorption/desorption isotherm at 30° C. for ethane in HUKST-1 and with the corresponding adsorption capacity for compressed ethylene at 30° C., and liquefied ethylene at −10° C., −20° C., and −30° C. In particular, this graph shows the density of ethylene (kg/m$^3$) as a function of pressure (bar). The adsorption of ethylene in the flexible MOF based on zinc centers and N,N'-di(1H-pyrazol-4-yl)ethane-1,2-diimine ligands of the present disclosure is noted by closed squares and the desorption is noted by open squares in FIG. 2. The isotherm for HUKST-1 at 30° C. is noted by closed circles.

Similarly to ethane in Example 1, FIG. 2 shows that ethylene adsorption on a flexible MOF, EMM-60, based on zinc centers and N,N'-di(1H-pyrazol-4-yl)ethane-1,2-diimine ligands results in higher storage capacity relative to the compressed gas. The gas density and storage capacity of liquefied ethylene gas is similarly to ethane gas in a range of about 350 kg/m$^3$ to about 450 kg/m$^3$. However, the same issues in matter of cost and safety remain. Adsorptive ethylene storage in the flexible MOF, EMM-60, based on zinc centers and N,N'-di(1H-pyrazol-4-yl)ethane-1,2-diimine ligands of the present disclosure takes place at a gas density of about 170 kg/m$^3$ to about 250 kg/m$^3$ at ambient temperature and under moderate pressure of about 10 bar. FIG. 2 shows the corresponding adsorption isotherms of ethylene on commercial HKUST-1 illustrating its high adsorption capacity of about 260 kg/m$^3$ at charging pressure (10 bar), but also the significant fraction of adsorbed gas (from about 180 kg/m$^3$ to about 250 kg/m$^3$) remaining within the porous MOF at discharging pressure of 2 bar to 10 bar.

Example 3

Figure 3:
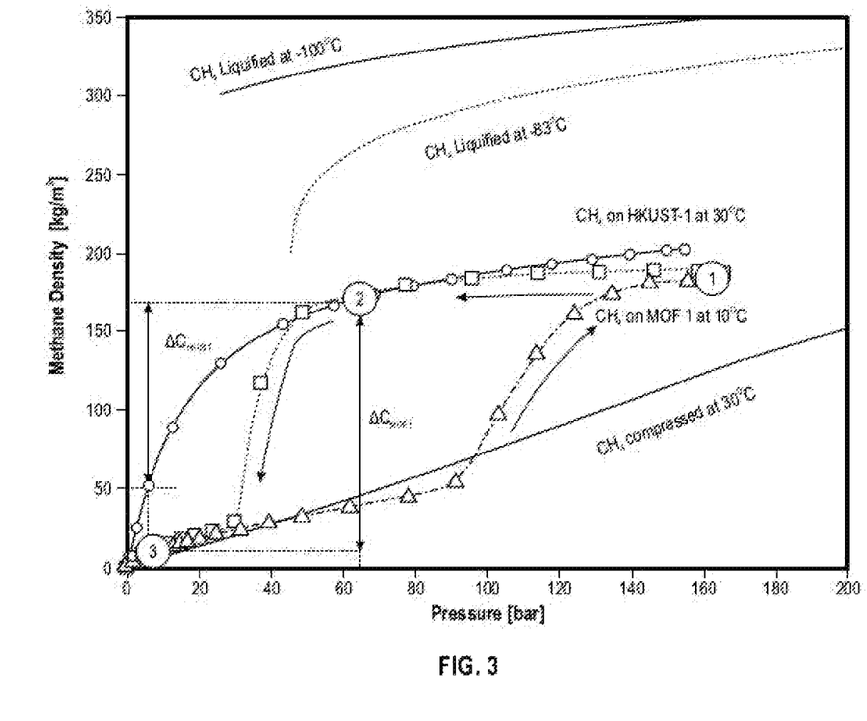
FIG. 3 presents a comparison between graphs illustrating methane density in function of the pressure for various storage and transportation means as described in Example 3.

FIG. 3 shows the adsorption/desorption isotherm at 30° C. for methane in a flexible MOF, EMM-60, based on zinc centers and N,N'-di(1H-pyrazol-4-yl)ethane-1,2-diimine ligands in comparison with the adsorption/desorption isotherm at 30° C. for methane in HUKST-1 and with the corresponding adsorption capacity for compressed methane at 30° C., and liquefied methane at −83° C. and −100° C. In particular, this graph shows the density of methane (kg/m$^3$) as a function of pressure (bar). The adsorption of ethylene in the flexible MOF, EMM-60, based on zinc centers and N,N'-di(1H-pyrazol-4-yl)ethane-1,2-diimine ligands of the present disclosure is noted by closed squares and the desorption is noted by open squares in FIG. 3. The isotherm for HUKST-1 at 30° C. is noted by closed circles.

Similarly to ethane in Example 1 and ethylene I Example 2, FIG. 3 shows that methane adsorption on a flexible MOF, EMM-60, based on zinc centers and N,N'-di(1H-pyrazol-4-yl)ethane-1,2-diimine ligands results in higher storage capacity relative to the compressed gas. The gas density and storage capacity of liquefied methane gas is in a range of about 200 kg/m$^3$ to about 350 kg/m$^3$. However, the same issues in matter of cost and safety remain. Adsorptive methane storage in the flexible MOF, EMM-60, based on zinc centers and N,N'-di(1H-pyrazol-4-yl)ethane-1,2-diimine ligands of the present disclosure takes place at a gas density of about 150 kg/m$^3$ to about 200 kg/m$^3$ at ambient temperature and under moderate pressure of about 60 bar. FIG. 3 shows the corresponding adsorption isotherms of methane on commercial HKUST-1 illustrating its high adsorption capacity of about 170 kg/m$^3$ at charging pressure (65 bar), but also the significant fraction of adsorbed gas (from about 50 kg/m$^3$ to about 170 kg/m$^3$) remaining within the porous MOF at discharging pressure of 5 bar to 30 bar.

Example 4

Figure 4:
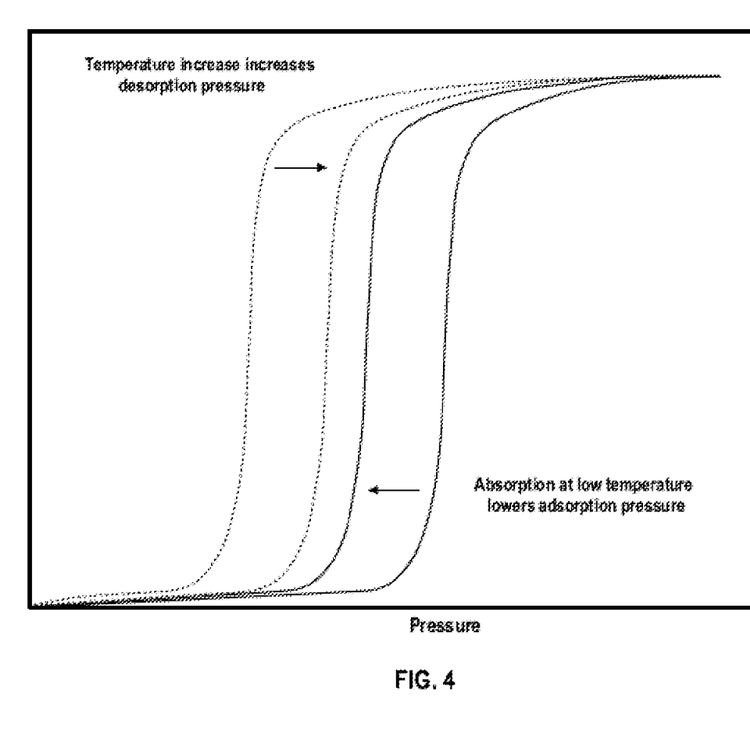
FIG. 4 is a conceptual illustration showing how temperature can be used to manipulate the isotherm steps, such as lowering loading temperatures and pressures to afford lower offloading pressures or increasing loading temperatures to afford higher offloading pressures according to Example 4.

FIG. 4 is an illustration showing that the adsorption and desorption steps described above are dependent on the temperature of the system. For example, at lower temperatures, adsorption steps occur at lower pressures while, conversely, adsorption steps move to higher pressures at elevated temperatures. This behavior can be leveraged to yield desorption/adsorption pressures at desired values. For example ethylene can be loaded into the flexible adsorbent and, upon heating, yield desorbed gas at a pressures higher than the 2 bar desorption pressure observed at 30° C. Conversely, methane could be loaded at lower temperatures allowing for adsorption at lower pressures, and upon temperature rise retain the adsorbed methane due to the large desorption hysteresis. This allows for loading and unloading of the methane at modest pressures without loss of the compressive energy inherent in the sample.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While systems and methods are described in terms of "comprising," "containing," or "including" various components or steps, the systems and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method for storing and/or transporting hydrocarbon fluids comprising:
   contacting a fluid comprising a light hydrocarbon with a metal-organic framework adsorbent having a plurality of internal pores, the metal-organic framework adsorbent comprising a plurality of divalent metal centers, the divalent metal centers comprising zinc;
   adsorbing the fluid at a first pressure and at a first temperature in at least a portion of the internal pores of the metal-organic framework adsorbent thereby creating an adsorbed fluid;
   storing the adsorbed fluid in the internal pores of the metal-organic framework adsorbent at a second pressure and at a second temperature; and
   releasing the adsorbed fluid from the internal pores of the metal-organic framework adsorbent,
   wherein the metal-organic framework adsorbent comprises a bis(pyrazolyl)ethanediimine ligand, and
   wherein the metal-organic framework adsorbent undertakes a reversible phase transition upon adsorbing the fluid.

2. The method of claim 1, further comprising the step of transporting the adsorbed fluid.

3. The method of claim 1, wherein the bis(pyrazolyl)ethanediimine ligand is N,N'-di(1H-pyrazol-4-yl)ethane-1,2-diimine.

4. The method of claim 1, wherein the internal pores have a pore volume in a range of about 0.1 cc/g to about 1 cc/g.

5. The method of claim 4, wherein the pore volume reversibly increases by about 0.5 cc/g to about 0.9 cc/g upon adsorbing the fluid.

6. The method of claim 1, wherein a crystal density of the metal-organic framework adsorbent is reversibly reduced from about 1.5 cc/g to about 0.5 cc/g upon adsorbing the fluid.

7. The method of claim 1, wherein the phase transition is endothermic.

8. The method of claim 1, wherein the first pressure decreases when the first temperature decreases.

9. The method of claim 1, wherein the second pressure increases when the second temperature increases.

10. The method of claim 1, wherein the fluid comprises methane.

11. The method of claim 1, wherein the first pressure is at least about 40 bar.

12. The method of claim 1, wherein the fluid comprises ethane or ethylene.

13. The method of claim 1, wherein the first pressure is at least about 2 bar.

14. A system for storing and/or transporting hydrocarbon fluids comprising:
   a metal-organic framework adsorbent having a plurality of internal pores, the metal-organic framework adsorbent comprising a plurality of divalent metal centers, the divalent metal centers comprising zinc; and
   a fluid comprising a light hydrocarbon,
      wherein the metal-organic framework adsorbent comprises a bis(pyrazolyl)ethanediimine ligand;
      wherein the metal-organic framework adsorbent undertakes a reversible phase transition upon adsorption and desorption of the fluid comprising the light hydrocarbon, the adsorption being carried out at a first pressure and at a first temperature;
      wherein the fluid is stored in the internal pores of the metal-organic framework adsorbent at a second pressure and at a second temperature.

15. The system of claim 14, wherein the fluid is transported at the second pressure from a first location to a second location.

16. The system of claim 14, wherein the bis(pyrazolyl)ethanediimine ligand is N,N'-di(1H-pyrazol-4-yl)ethane-1,2-diimine.

17. The system of claim 14, wherein the first pressure decreases when the first temperature decreases.

18. The system of claim 14, wherein the second pressure increases when the second temperature increases.

* * * * *